(12) United States Patent
Sato

(10) Patent No.: US 7,589,159 B2
(45) Date of Patent: Sep. 15, 2009

(54) PROCESS FOR PRODUCING RADICAL POLYMER

(75) Inventor: Tsuneyuki Sato, Tokushima (JP)

(73) Assignee: Techno Network Shikoku Co., Ltd., Takamatsu-shi (JP)

( * ) Notice: Subject to any disclaimer, the term of this patent is extended or adjusted under 35 U.S.C. 154(b) by 635 days.

(21) Appl. No.: 10/570,658

(22) PCT Filed: May 7, 2004

(86) PCT No.: PCT/JP2004/006030

§ 371 (c)(1),
(2), (4) Date: Mar. 6, 2006

(87) PCT Pub. No.: WO2005/037873

PCT Pub. Date: Apr. 28, 2005

(65) Prior Publication Data

US 2007/0032615 A1    Feb. 8, 2007

(30) Foreign Application Priority Data

Oct. 20, 2003    (JP)    ............................. 2003-358626

(51) Int. Cl.
*C08F 2/40* (2006.01)
*C08F 2/06* (2006.01)
*C08F 236/20* (2006.01)

(52) U.S. Cl. .................. 526/89; 526/219.3; 526/219.6; 526/323.2; 526/330; 526/336; 526/909

(58) Field of Classification Search .................. 526/89, 526/219.3, 219.6, 323.2, 336, 330, 909
See application file for complete search history.

(56) References Cited

U.S. PATENT DOCUMENTS

| | | | |
|---|---|---|---|
| 3,948,867 A * | 4/1976 | Bader et al. .................... 526/79 |
| 4,524,183 A | 6/1985 | Weber | |
| 4,656,237 A | 4/1987 | Weber | |
| 4,668,735 A | 5/1987 | Fukumoto et al. | |
| 4,952,638 A | 8/1990 | Arai et al. | |
| 5,047,490 A | 9/1991 | Pehlah | |
| 5,231,141 A | 7/1993 | Arai et al. | |
| 6,239,224 B1 * | 5/2001 | Mørk et al. .................. 525/242 |

FOREIGN PATENT DOCUMENTS

| | | |
|---|---|---|
| EP | 0182113 A1 | 5/1986 |
| EP | 0209504 A2 | 1/1987 |
| JP | S59-06415 A | 4/1984 |
| JP | S60-112866 A | 6/1985 |
| JP | S61-108613 A | 5/1986 |
| JP | S62-277408 A | 12/1987 |
| JP | S64-14222 A | 1/1989 |
| JP | H04-314704 A | 11/1992 |
| JP | H05-178912 A | 6/1993 |
| JP | H09-012610 A | 1/1997 |
| JP | 2000-204104 A | 7/2000 |
| JP | 2002-179707 A | 6/2002 |
| WO | WO 95/34583 A | 12/1995 |

OTHER PUBLICATIONS

Hoppenbrouwers et al., Triblock Nanospheres with Amphiphilic Coronal Chains, Macromolecules, 36:876-881 (2003).

* cited by examiner

*Primary Examiner*—Fred M Teskin
(74) *Attorney, Agent, or Firm*—Fitch, Even, Tabin & Flannery; Kendrew H. Colton

(57) ABSTRACT

The present invention provides a process for producing a resin powder containing a radical polymer having a volume-average primary-particle diameter of 1 nm to 300 nm and containing no impurities such as surfactants by a simple procedure without via multistage reactions. The process for producing a resin powder (J) comprising a radical polymer obtained by polymerizing a bifunctional radical-polymerizable monomer (A) with a ter- or higher functional radical-polymerizable monomer (B) in the presence of 15 mol % to 170 mol % polymerization initiator (C), based on the sum of monomers (A) and (B).

8 Claims, No Drawings

PROCESS FOR PRODUCING RADICAL POLYMER

This Application is the National Phase of International Application No. PCT/JP2004/006030 filed May 7, 2004, which designated the U.S. and was not published under PCT Article 21(2) in English, and this application claims, via the aforesaid International Application, the foreign priority benefit of and claims the priority from Japanese Application No. 2003-358626, filed Oct. 20, 2003, and the complete disclosures of all the aforesaid applications are incorporated herein by reference.

TECHNICAL FIELD

The present invention relates to a process for producing a resin powder comprising a radical polymer. More specifically, the present invention relates to a process for easily producing a fine resin powder.

BACKGROUND ART

Known processes for producing fine resin powders include emulsion polymerization processes (e.g. see Patent literature 1) and anionic polymerization processes (e.g. see Non-patent literature 1).

However, emulsion polymerization processes pose drawbacks in that polymers obtained thereby contain impurities such as surfactants, thereby necessitating a subsequent step of washing to remove the impurities, and hence failing to offer a simple production process.

Anionic polymerization similarly poses drawbacks by involving multistep reactions, and thus failing to provide a simple production process.

[Patent literature 1] Unexamined Japanese Patent Publication No. 1998-501294

[Non-patent literature 1] Macromolecules, Vol. 36, 876 (2003)

An object of the present invention is to provide a process for producing a simple resin powder, which solves the above problems.

DISCLOSURE OF THE INVENTION

The present inventor has conducted extensive research to solve the above problems and accomplished the present invention.

The present invention provides a process for producing a resin powder (J) comprising a radical polymer obtained by polymerizing a bifunctional radical-polymerizable monomer (A) with a ter- or higher functional radical-polymerizable monomer (B), in the presence of 15 to 170 mol % of a polymerization initiator (C), based on the sum of the monomers (A) and (B). The present invention will be described below in detail.

BEST MODE FOR CARRYING OUT THE INVENTION

The process for producing a resin powder comprising a radical polymer of the present invention has the following advantages.

1. With the production process of the present invention, a resin powder comprising a radical polymer having a volume-average primary-particle diameter of 1 nm to 300 nm can be easily obtained, using facilities and materials for common radical polymerizations at temperatures, times, pressures and the like as employed in common radical polymerizations.
2. A very wide variety of monomer compositions can be selected from to obtain a resin powder comprising a radical polymer by the production process of the present invention.
3. A resin powder comprising a radical polymer obtained by the production process of the present invention is a three-dimensional polymer including a number of different highly-branched functional terminal groups.

The process for producing a resin powder (J) comprising a radial polymerization of the present invention enables a resin fine powder to be easily produced using a polymerization initiator (C) in a specific molar ratio range, based on the sum of a bifunctional radical-polymerizable monomer (A) and a ter- or higher functional radical-polymerizable monomer (B).

Polymerization initiator (C) is usually used, based on the sum of the monomers (A) and (B), in an amount of at least 15 mol %, preferably at least 30 mol %, more preferably at least 35 mol %, further preferably at least 40 mol %, and particularly preferably at least 50 mol %, and usually no more than 170 mol %, preferably no more than 160 mol %, and more preferably no more than 150 mol %. When initiator (C) is used in an amount below 15 mol %, the resulting polymer will be gelated. On the other hand, when initiator (C) is used in an amount exceeding 170 mol %, a polymer will not be produced.

In the present invention, functionality refers to the number of potential linkages, which a compound can form when forming a polymer.

Bifunctional radical-polymerizable monomers (A) in the invention include, for example, bifunctional monomers of (1) to (12) below, and mixtures of two or more such monomers.

(1) Vinyl-type Hydrocarbons ((1)-1) Aliphatic Vinyl-type Hydrocarbons:
Ethylene, diphenylethylene, propylene, butene, isobutylene, pentene, heptene, diisobutylene, octene, dodecene, octadecene, (α-olefins other than those already mentioned, etc.

((1)-2) Alicyclic Vinyl-type Hydrocarbons:
Cyclohexene, pinene, limonene, indene, vinylcyclohexane, ethylidenebicycloheptane, etc.

((1)-3) Aromatic Vinyl-type Hydrocarbons:
Styrene, (α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, vinylnaphthalene, etc.

(2) Carboxy Group-containing Vinyl-type Monomers and Salts Thereof
Carboxy group-containing vinyl-type monomers such as (meth)acrylic acid, maleic acid/anhydride, maleic acid monoalkyl esters, fumaric acid, fumaric acid monoalkyl esters, crotonic acid, itaconic acid, itaconic acid monoalkyl esters, itaconic acid glycol monoethers, citraconic acid, citraconic acid monoalkyl esters, cinnamic acid, etc.; and alkali metal salts (sodium salts, potassium salts, etc.), alkaline-earth metal salts (calcium salts, magnesium salts, etc.), amine salts, and ammonium salts thereof, etc.

(3) Sulfone Group-containing Vinyl-type Monomers, Monomers Monoesterified with Vinyl-type Sulfonic Acids, and Salts Thereof
Vinylsulfonic acid (and salts thereof), (meth)allylsulfonic acid (and salts thereof), methyl vinylsulfonate, styrenesulfonic acid (and salts thereof), α-methylstyrenesulfonic acid (and salts thereof), sulfopropyl (meth)acrylate, 2-hydroxy-3-(meth)acryloxypropylsulfonic acid (and salts thereof), 2-(meth)acryloylamino-2,2-dimethylethanesulfonic acid (and salts thereof), 2-(meth)acryloyloxyethanesulfonic acid (and salts thereof), 3-(meth)acryloyloxy-2-hydroxypropane sulfonic acid (and salts thereof), 2-(meth) acrylamide-2-methylpropanesulfonic acid (and salts thereof), 3-(meth) acrylamide-2-hydroxypropanesulfonic acid (and salts thereof), alkyl (3 to 18 carbon atoms) allylsulfosuccinic acids (and salts thereof), poly (n=2 to 30) oxyalkylene (ethylene, propylene, butylene: single, random, block) mono(meth)acrylates esterified with sulfuric acid (and salts thereof) [e.g. poly (n=5 to 15) oxypropylenemonomethacrylates esterified with sulfuric acid (and salts thereof), etc.], polyoxyethylene multi phenyl ether sulfates (and salts thereof), and other compounds represented by the formulae (1) to (3) below. [Examples of the above salts include alkali metal salts (sodium salts, potassium salts, etc.), alkaline-earth metal salts (calcium salts, magnesium salts, etc.), amine salts, and ammonium salts.]

Formula 1

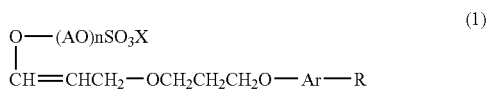

(1)

wherein R represents an alkyl group having 1 to 15 carbon atoms; A represents an alkylene group having 2 to 4 carbon atoms, and if n is more than two, each may be different or may all be the same, and if different, the n groups may be random or block; X represents an alkali metal, alkaline-earth metal, ammonium, or amine cation; Ar represents a benzene ring; and n is an integer from 1 to 50.

Formula 2

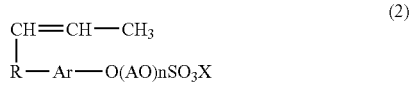

(2)

wherein R represents an alkylene group having 1 to 15 carbon atoms; A represents an alkylene group having 2 to 4 carbon atoms; n may be different or same when present more than two, and if different, the n groups may be random or block; X represents an alkali metal, alkaline-earth metal, ammonium, or amine cation; Ar represents a benzene ring; and n is an integer from 1 to 50.

Formula 3

(3)

wherein R' represents an alkyl group having 1 to 15 carbon atoms and which may be substituted with fluorine atoms; and X represents an alkali metal, alkaline-earth metal, ammonium, or amine cation.

(4) Phosphate Group-containing Vinyl-type Monomers
(Meth)acrylic acid hydroxyalkyl phosphoric acid monoesters, e.g. 2-hydroxyethyl(meth)acryloyl phosphate, phenyl-2-acryloyloxyethyl phosphate; (meth)acrylic acid alkylphosphonic acids, e.g. 2-acryloyloxyethyl phosphonic acid (and salts thereof); etc.

(5) Hydroxy Group-containing Vinyl-type Monomers
Hydroxystyrene, N-methylol(Meth)Acrylamide, hydroxyethyl(meth)acrylate, hydroxypropyl (meth)acrylate, polyethylene glycol mono(meth)acrylate, (meth)allyl alcohol, crotyl alcohol, isocrotyl alcohol, 1-buten-3-ol, 2-buten-1-ol, 2-buten-1,4-diol, propargyl alcohol, 2-hydroxyethyl propenyl ether, allyl sucrose ethers, etc.

(6) Nitrogen-containing Vinyl-type Monomers ((6)-1) Amino Group-containing Vinyl-type Monomers
Aminoethyl(meth)acrylate, dimethylaminoethyl(meth)acrylate, diethylaminoethyl(meth)acrylate, t-butylaminoethyl methacrylate, N-aminoethyl(meth)acrylamide, (meth)allylamine, morpholinoethyl(meth)allylamine, crotylamine, N,N-dimethylamino styrene, methyl ac-acetoaminoacrylate, vinylimidazole, N-vinylpyrrole, N-vinylthiopyrrolidone, N-arylphenylenediamines, amino cacrylate, 4-vinyl picrirate, 4-vinyl pyruvazole, aminothiazole, aminoindole, aminopyrrole, aminoimidazole, aminomercaptothiazole, salts thereof, etc.

((6)-2) Amide Group-containing Vinyl-type Monomers
(Meth)acrylamide, N-methyl(meth)acrylamide, N-butylacrylamide, diacetoneacrylamide, N-methylol(meth)acrylamide, N,N'-methylene-bis(meth)acrylamide, cinnamic acid amide, N,N-dimethylacrylamide, N,N-dibenzylacrylamide, N-isopropylacrylamide, methacrylformamide, N-methyl-N-vinylacetamide, N-vinylpyrrolidone, etc.

((6)-3) Nitrile Group-containing Vinyl-type Monomers
(Meth)acrylonitrile, cyanostyrene, etc., ((6)-4) Quaternary Ammonium Cation Group-containing Vinyl-type Monomers
Quaternarized (using a quaternarizing agent such as methyl chloride, dimethyl sulfate, benzyl chloride, dimethyl carbonate, etc.) vinyl-type monomers containing tertiary amino groups such as dimethylaminoethyl(meth)acrylate, diethylaminoethyl(meth)acrylate, dimethylaminoethyl (meth)acrylamide, diethylaminoethyl(meth)acrylamide, and diallylamine, etc.

((6)-5) Nitro Group-containing Vinyl-type Monomers
Nitrostyrene, etc.

(7) Epoxy Group-containing Vinyl-type Monomers
Glycidyl(meth)acrylate, tetrahydrofurfuryl(meth)acrylate, p-vinylphenyl glycidyl ether, etc.

(8) Halogen Element-containing Vinyl-type Monomers
Vinyl chloride, vinyl bromide, vinylidene chloride, 1-chloropropylene, dichloroethylene, allyl chloride, chlorostyrene, bromostyrene, dichlorostyrene, chloromethylstyrene, tetrafluorostyrene, etc.

(9) Vinyl Esters, Vinyl Ethers, Vinyl Ketones
Vinyl acetate, vinyl butyrate, vinyl propionate, vinyl butanoate, isopropenyl acetate, methyl 4-vinylbenzoate, cyclohexyl methacrylate, benzyl methacrylate, phenyl (meth) acrylate, vinyl methoxyacetate, vinyl benzoate, vinyl methyl ether, vinyl ethyl ether, isobutyl ether, vinyl propyl ether, vinyl butyl ether, vinyl 2-ethylhexyl ether, vinyl phenyl ether, vinyl 2-methoxyethyl ether, methoxy butadiene, vinyl 2-butoxyethyl ether, 3,4-dihydro-1,2-pyran, 2-butoxy-2'-vinyloxydiethyl ether, vinyl 2-ethylmercaptoethyl ether, vinyl methyl ketone, vinyl ethyl ketone, vinyl phenyl ketone, p-vinyldiphenyl sulfide, vinyl ethyl sulfide, vinyl ethyl sulfone, dialkyl fumarates (the two alkyl groups are each linear-, branched- or alicyclic groups having 2 to 8 carbon atoms), dialkyl maleates (the two alkyl groups are each linear-, branched- or alicyclic groups having 2 to 8 carbon atoms), etc.

(10) (Meth)Acrylic Acid Esters

Alkyl(meth)acrylates having alkyl groups of 1 to 50 carbon atoms such as methyl(meth)acrylate, ethyl(meth)acrylate, propyl (meth)acrylate, butyl(meth)acrylate, 2-ethylhexyl (meth)acrylate, dodecyl(meth)acrylate, hexadecyl(meth)acrylate, heptadecyl(meth)acrylate, eicosyl(meth)acrylate, 2-mercaptoethyl(meth)acrylate, etc.

(11) Vinyl-type Monomers with a Polyalkylene Glycol Chain

Polyethylene glycol (molecular weight 300) mono(meth)acrylate, polypropylene glycol (molecular weight 500) monoacrylate, 10-equivalents-of-ethylene-oxide-adduct of methyl alcohol ester of (meth)acrylic acid, 30-equivalents-of-ethylene-oxide-adduct of lauryl alcohol ester (meth)acrylic acid, etc.

(12) Other Vinyl-type Monomers

Acetoxystyrene, phenoxystyrene, ethyl α-ethoxyacrylate, isocyanatoethyl(meth)acrylate, cyanoacrylate, m-isopropenyl-α, α-dimethylmethylbenzylisocyanate, 4-vinyl-t-butyl-benzene carboperoxy ester, etc.

Preferable monomers among these are (1) Vinyl-type hydrocarbons, especially ((1)-1) aliphatic vinyl-type hydrocarbons and ((1)-3) aromatic vinyl-type hydrocarbons; (2) carboxy group-containing vinyl-type monomers; (6) nitrogen-containing vinyl-type monomers, especially ((6)-2) amide group-containing vinyl-type monomers; (8) halogen element-containing vinyl-type monomers; (9) vinyl esters, vinyl ethers, vinyl ketones; and (10) (meth)acrylic acid esters; and in particular, ethylene, diphenylethylene, styrene, ethylstyrene, (meth)acrylic acid, fumaric acid, (meth)acrylamide, N-isopropylacrylamide, vinyl chloride, allyl chloride, vinyl acetate, vinyl methyl ether, vinyl ethyl ether, isobutyl vinyl ether, vinyl methyl ketone, vinyl ethyl ketone, methyl(meth)acrylate, ethyl(meth)acrylate, butyl(meth)acrylate, and 2-ethylhexyl(meth)acrylate.

Radical-polymerizable monomers (B) with ter- or higher functionality usable in the invention are, for example, those of (1) to (12) above with ter- or higher functionality, and mixtures of two or more such monomers. Of these, terfunctional monomers are preferable.

Specific examples are as follows.

(1) Vinyl-type Hydrocarbons ((1)-1) Aliphatic Vinyl-type Hydrocarbons

Isoprene, butadiene, 3-methyl-1,2-butadiene, 2,3-dimethyl-1,3-butadiene, pentadiene, hexadiene, octadiene, 1,3,5-hexatriene, etc.

((1)-2) Alicyclic Vinyl-type Hydrocarbons

Cyclopentadine, cyclohexadiene, etc.

((1)-3) Aromatic Vinyl-type Hydrocarbons

Divinylbenzene, divinyltoluene, divinylxylene, trivinylbenzene, etc.

(2) Carboxy Group-containing Vinyl-type Monomers and Salts Thereof

Carboxy group-containing vinyl-type monomers such as monoallyl maleate, monoallyl phthalate, monovinyl fumarate, monovinyl maleate, monovinyl itaconate, etc.; alkali metal salts thereof (sodium salts, calcium salts, etc.); alkaline-earth metal salts thereof (calcium salt, magnesium salt, etc.); etc.

(3) Sulfon Group-containing Vinyl-type Monomers, Monomers Monoesterified With Vinyl-type Sulfonic Acids and Salts Thereof Divinyl sulfide, divinyl sulfon, divinyl sulfoxide, diallyl disulfide, etc.

(4) Phosphate Group-containing Vinyl-type Monomers

Diallyl phenyl phosphate, etc.

(5) Hydroxy Group-containing Vinyl-type Monomers

Divinyl glycol (1,5-hexadiene-3,4-diol), etc.

(6) Nitrogen-containing Vinyl-type Monomers

Diallylamine, diallylisocyanurate, diallylcyanurate, 1-cyanobutadiene, methylenebisacrylamide, bismaleimide, etc.

(8) Halogen Element-containing Vinyl-type Monomers

Chloroprene, diallylamine hydrochloride, etc.

(9) Vinyl Esters, Vinyl Ethers, Vinyl Ketones

Diallyl maleate, diallyl phthalate, divinyl adipate, diallyl adipate, vinyl alkyl fumarates, divinyl maleate, divinyl itaconate, divinyl alkyl itaconates, vinyl cinnamate, vinyl crotonate, allyl cinnamate, divinyl ether, diallyl ether, diethylene glycol divinyl ether, triethylene glycol divinyl ether, 2-methoxybutadiene, divinyl ketone, vinyl(meth)acrylate, poly(meth)allyloxyalkanes [diallyloxyethane, triallyloxyethane, tetraallyloxyethane, tetraallyloxypropane, tetraallyloxybutane, tetramethallyloxyethane, etc.], etc.

(10) (Meth)acrylic Acid Esters

Vinyl(meth)acrylate, allyl(meth)acrylate, and poly(meth)acrylates of polyhydric alcohols, such as ethylene glycol di(meth)acrylate, triethylene glycol di(meth)acrylate, propylene glycol di(meth)acrylate, neopentyl glycol di(meth)acrylate, trimethylolpropane tri(meth)acrylate, glycerol tri(meth)acrylate, pentaerythritol tetrapenta(meth)acrylate, pentaerythritol penta(meth)acrylate, etc.

(11) Vinyl-type Monomers with a Polyalkylene Glycol Chain

Polyethylene glycol (molecular weight 300) di(meth)acrylate, polypropylene glycol (molecular weight 500) diacrylate, etc.

(12) Other Vinyl-type Monomers

Divinyldimethylsilane, 1,4-divinylperfluorobutane, 1,3-divinyltetramnethyldisiloxane, 1,1,3,3-tetramethyl-1,3-divinyldisiloxane, etc.

Preferable among these are monomers with ter- or higher functionality of (1) vinyl-type hydrocarbons, especially ((1)-3) aromatic vinyl-type hydrocarbons, (9) vinyl esters, vinyl ethers, vinyl ketones, and (11) vinyl-type monomers with polyalklene glycol chains; and in particular, divinylbenzene, ethylene glycol dimethacrylate, and diallyl adipate.

Polymerization initiators (C) usable in the invention include, for example, peroxide-polymerization initiators, azo polymerization initiators, redox polymerization initiators containing a peroxide polymerization initiator and a redutant, and mixtures of two or more of these initiators.

Usable peroxide polymerization initiators are oil-soluble peroxide polymerization initiators, water-soluble peroxide polymerization initiators, etc.

Examples of oil-soluble peroxide polymerization initiators include;

(1) Ketone peroxides (methyl ethyl peroxide, methyl isobutyl peroxide, acetylacetone peroxide, cyclohexanone peroxide, etc.)
(2) Hydroperoxides (1,1,3,3-tetramethyl butyl peroxide, cumene hydroperoxide, t-butyl hydroperoxide, etc.)

(3) Diacyl peroxides (isobutyryl peroxide, bis-3,5,5-trimethylhexanoyl peroxide, lauroyl peroxide, benzoyl peroxide, etc.)
(4) Dialkyl peroxides (dicumyl peroxide, 2,5-dimethyl-2,5-di-(t-butylperoxyhexane), 1,3-bis(t-butylperoxyisopropyl)benzene, t-butyl cumyl peroxide, di-t-butyl peroxide, 2,5-dimethyl-2,5 di-(t-butylperoxy)hexane, tris(t-butylperoxy)triazine, etc.)
(5) Peroxyketals (1,1-di-t-butylperoxy-3,3,5-trimethyl cyclohexyl peroxide, 1,1-di-t-peroxycyclohexane, 2,2-di (t-)butylperoxy)butane, n-butyl 4,4-di-t-butylperoxyvalerate, 2,2-bis(4,4-di-t-butylperoxycyclohexyl)propane, etc.)
(6) Alkyl peresters (1,1,3,3-tetramethylbutyl peroxyneodecanoate, α-cumyl peroxyneodecanoate, t-butyl peroxyneodecanoate, t-butyl peroxyneopentanoate, t-butyl peroxypivalate, 1,1,3,3-tetramethylbutyl peroxy-2-ethylhexanoate, t-amyl peroxy-2-ethylhexanoate, t-butyl peroxy-2-ethylhexanoate, t-butyl peroxyisobutanorate, di-t-butyl peroxyhexahydrotetraphthalate, t-amyl peroxy-3,5,5-trimethylhexanoate, t-butyl peroxy-3,5,5-trimethylhexanoate, t-butyl peroxyacetate, t-butyl peroxybenzoate, dibutyl peroxytrimethyladipate, etc.)
(7) Percarbonates (di-3-methoxybutyl peroxydicarbonate, di-2-ethylhexyl peroxydicarbonate, bis-(4-t-butylcyclohexyl)peroxydicarbonate, diisopropyl peroxydicarbonate, t-butylperoxy isopropyl carbonate, t-butyl peroxy 2-ethylhexyl carbonate, 1,6-bis(t-butyl peroxycarbonyloyl)hexane, diethylene glycol-bis(t-butyl peroxy carbonate), etc.) Preferable among these are (1) ketone peroxides, (2) hydroperoxides, (4) dialkyl peroxides, and (6) alkyl peresters, and especially preferable are methyl ethyl-ketone peroxide, cumene hydroperoxide, t-butyl peroxide and t-butyl peroxybenzoate.

Usable water-soluble peroxide polymerization initiators are, for example, hydrogen peroxide, peracetic acid, ammonium persulfate, potassium persulfate, sodium persulfate, etc. Preferable are hydrogen peroxide, ammonium persulfate, and sodium persulfate.

Usable azo polymerization initiators are oil-soluble azo polymerization initiators, water-soluble azo polymerization initiators, etc.

Examples of oil-soluble azo polymerization initiators include;
(1) Azonitrile-type [2,2'-azobisisobutyronitrile, 1,1'-azobiscyclohexane 1-carbonitrile, 2,2'-azobis-4-methoxy-2,4-dimethylvaleronitrile, 2,2'-azobis-2,4-dimethylvaleronitrile, 2,2'-asobis(4-methoxy-2,4-dimethylvalelonitrile), 2,2'-azobis(2-methylbutylonitrile), etc.]
(2) Azoamide-type (2,2'-azobis[N-(2-propenyl)-2-methyl propionamide], 2,2'-azobis(N-butyl-2-methylpropionamide), 2,2'-azobis(N-cyclohexyl-2-methylpropionamide), etc.)
(3) Others (2,2'-azobis(2,4,4-trimethylpentane), dimethyl 2,2'-azobisisobutanoate, 1,1'-azobis(1-acetoxy-1-phenylethane), etc.) etc.

Preferable initiators among these are (1) azonitrile-type initiators, and (3) others, and especially preferable are 2,2'-azobisisobutyronitrile and dimethyl 2,2'-azobisisobutanoate.

Examples of water-soluble azopolymerization initiators are as follows:
(1) Azonitrile-type (2-(carbamoylazo)isobutyronitrile, etc.);
(2) Azoamide-type (2,2'-azobis{2-methyl-N-[2-(1-hydroxybutyl)]propionamide}, 2,2'-azobis[2-methyl-N-(2-hydroxyethyl)propionamide], 2,2'-azobis(2-methyl propionamide)dihydrochloride, 2,2'-azobis[N-(2-carboxyethyl)-2-methylpropionamidine, etc.];
(3) Alicyclic azoamido-type (2,2'-azobis[2-(5-methyl-2-imidazolin-2-yl)propane]dihydrochloride, 2,2'-azobis[2-(2-imidazolin-2-yl)propane]dihydrochloride, 2,2'-azobis [2-(2-imidazolin-2-yl)propane]disulphate dihydrate, 2,2'-azobis[2-(3,4,5,6-tetrahydropyrimidin-2-yl)propane] dihydrochloride, 2,2-azobis{2-[1-(2-hydroxyethyl)-2-imidazolin-2-yl]propane}dihydrochloride, 2,2'-azobis[2-(2-imidazolin-2-yl)propane], etc.); etc.

Of these, preferable are (1) azonitrile-type and (2) azoamide-type initiators, and especially preferable are 2-(carbamoylazo)isobutyronitrile and 2-methyl-N-[2-(1-hydroxybutyl)]-propionamide.

Examples of usable redox polymerization initiators are oil-soluble redox polymerization initiators, water-soluble redox polymerization initiators, and the like.

Oil-soluble redox polymerization initiators:

Examples of peroxide polymerization initiators include hydroperoxides (tert-butyl hydroperoxide, cumene hydroperoxide, etc.), dialkyl peroxides (lauroyl peroxide, etc.), diacyl peroxides (benzoyl peroxide, etc.), and like oil-soluble peroxides.

Examples of reducing agents include tertiary amines (triethylamine, tributylamine, etc.), naphthenates, mercaptans (mercaptoethanol, lauryl mercaptan, etc.), organometallic compounds (triethyl aluminium, triethyl boron, diethyl zinc, etc.) and like oil-soluble reducing agents.

Among these, preferable combination examples of a peroxide polymerization initiator and a reducing agent include cumene hydroperoxide and triethyl aluminium, benzoyl peroxide and triethylamine, etc.

Water-soluble redox polymerization initiators:

Examples of peroxide polymerization initiators include water-soluble peroxides such as persulfates (potassium persulfate, ammonium persulfate, etc.), hydrogen peroxide, hydroperoxides (tert-butyl hydroperoxide, cumene hydroperoxide, etc.), etc. Examples of reducing agents include divalent ferrates, sodium hydrogen sulfite, alcohols, dimethylaniline, etc.

Among these, preferable combinations of a peroxide polymerization initiator and a reducing agent include, for example, hydrogen peroxide and a divalent ferrate, a persulfate and sodium sulfite, etc.

For better reactivity, the above-mentioned radical-polymerizable monomer (B) is used, per 100 mol of the radical-polymerizable monomer (A), in a proportion of preferably 20 mol or greater, more preferably 30 mol or greater, and especially preferably 40 mol or greater, and for the same reason it is used in a proportion of preferably 500 mol or less, more preferably 400 mol or less, and especially preferably 200 mol or less.

The resin powder (J) can be obtained by the polymerization of monomers (A) and (B) in the presence of polymerization initiator (C), and it is more preferable that the polymerization of monomers (A) and (B) be carried out in the presence of an inhibitor (D) in addition to polymerization initiator (C).

Usable inhibitors (D) include the following (D1) and (D2).

Inhibitors (D1) include a compound having a suppressive effect on radical polymerization.

Inhibitors (D2) include a known polymerization inhibitor commonly used during radical polymerization. Inhibitor (D) is preferably added dropwise during the polymerzation reaction of monomers (A) and (B).

Specific examples of inhibitors (D1) are nitrobenzene, dinitrobenzene, thiophene, tetramethylthiuram disulfide, methylbenzyloxyimino acetate, glyoxylic oxime ether, and the like.

Preferable among these are methylbenzyloxyimino acetate, and the like.

Specific examples of inhibitors (D2) are quinone-type polymerization inhibitors (hydroquinone, methoxy hydroquinone, duroquinone, benzoquinone, diphenylbenzoquinone, 2,5-di-t-butylbenzoquinone, 2,6-di-t-butylbenzoquinone, p-tert-butylcatechol, etc.); alkylphenol-type polymerization inhibitors (2,6-di-tert-butylphenol, 2,4-di-tert-butylphenol, 2-tert-butyl-4,6-dimethylphenol, 2,6-di-tert-butyl-4-methylphenol, 2,4,6-tri-tert-butylphenol, etc.); amine-type polymerization inhibitors (alkylated diphenylamines, N,N'-diphenyl-p-phenylenediamine, phenothiazine, 4-hydroxy-2,2,6,6-tetramethylpiperidine, 4-benzoyloxy-2,2,6,6-tetramethylpiperidine, 1,4-dihydroxy-2,2,6,6-tetramethylpiperidine, 1-hydroxy-4-benzoyloxy-2,2,6,6-tetramethylpiperidine, etc.); dithiocarbamic acid copper-type polymerization inhibitors (copper dimethyldithiocarbamate, copper diethyldithiocarbamate, copper dibutyldithiocarbamate, etc.); N-oxyl-type polymerization inhibitors (ester of 2,2,6,6-tetramethylpiperidine-N-oxyl, 4-hydroxy-2,2,6,6-tetramethylpiperidine-N-oxyl, 4-benzoyloxy-2,2,6,6-tetramethylpiperidine-N-oxyl, or 4-hydroxy-2,2,6,6-tetramethylpiperidine-N-oxyl, etc.); and the like.

Preferable among these are quinone-type polymerization inhibitors, alkylphenol-type polymerization inhibitors, amine-type polymerization inhibitors, etc. Especially preferable are hydroquinone, duroquinone, benzoquinone, diphenylbenzoquinone, 2,5-di-t-butyl benzoquinone, 2,6-di-t-butyl benzoquinone, 2,6-di-tert-butylphenol, 2,4-di-tert-butylphenol, 2,6-di-tert-butyl-4-methylphenol, alkylated diphenylamines, phenothiazine, 4-hydroxy-2,2,6,6-tetramethylpiperidine, etc.

The proportion of inhibitor (D) to be used for better reactivity is usually from 1 mol % to 2000 mol %, and preferably 3 mol % to 500 mol %, per combined mol amount of bifunctional radical-polymerizable monomer (A) and radical-polymerizable monomer (B) with ter- or higher functionality.

The afore-mentioned polymerization initiator (C) can be preferably added to monomers (A) and (B) by one of the following procedures:
(1) (C) is mixed with (A) and (B) before polymerization;
(2) (C) is partially mixed with (A) and (B) before polymerization is initiated, and the remaining (C) is further added during the polymerization reaction; or
(3) after the initiation of the polymerization of (A) and (B), (C) is added to the resulting reactant for further polymerization reaction.

Inhibitor (D) may optionally be added in the same manner as in (C).

The monomers (A) and (B), and if necessary. inhibitor (D), can be polymerized by known methods such as solution polymerization, dispersion polymerization, precipitation polymerization, mass polymerization, and the like. Preferable among these are solution polymerization and precipitation polymerization. In light of adjusting molecular weight, the polymerization reaction is favorably carried out in an organic solvent. Polymerization reaction can be performed under normal pressure, pressure applied hermetically, or reduced pressure, and it is preferable that polymerization reaction be hermetically carried out under an applied pressure. Temperatures for polymerization reaction range from 50° C. to 200° C., and more preferably 70° C. to 150° C.

The polymerization reaction of the present invention is advantageously performed in the presence of an organic solvent.

Examples of organic solvents include aromatic hydrocarbon-type solvents such as benzene, toluene, xylene, ethylbenzene, tetralin, etc.; aliphatic or cycloaliphatic hydrocarbon-type solvents such as n-hexane, n-heptane, mineral spirits, cyclohexane, etc.; halogenated solvents such as methyl chloride, methyl bromide, methyl iodide, methylene dichloride, chloroform, carbon tetrachloride, trichloroethylene, perchloroethylene, etc.; esters and ester ether-type solvents such as ethyl acetate, butyl acetate, methoxybutyl acetate, methyl cellosolve acetate, ethyl cellosolve acetate, etc.; ether-type solvents such as diethyl ether, tetrahydrofuran, dioxane, ethyl cellosolve, butyl cellosolve, propylene glycol monomethyl ether, etc.; ketone-type solvents such as acetone, methyl ethyl ketone, methyl isobutyl ketone, di-n-butyl ketone, cyclohexanone and the like; alcohols solvents such as methanol, ethanol, n-propanol, isopropanol, n-butanol, isobutanol, t-butanol, 2-ethylhexyl alcohol, benzyl alcohol, etc.; amide-type solvents such as dimethylformamide, dimethylacetamide, etc.; dimethyl sulfoxide and like sulfoxide-type solvents; N-methylpyrolidone and like heterocyclic-type solvents; and mixed solvents of two or more of these solvents.

Among these, preferable are aromatic hydrocarbon-type solvents, chlorinated solvents, ester-type solvents, ether-type solvents, ketone-type solvents, alcohols solvents, amide-type solvents, sulfoxide-type solvents, etc. Especially preferable are benzene, toluene, xylene, chloroform, ethyl acetate, butyl acetate, tetrahydrofuran, dioxane, acetone, methyl ethyl ketone, methanol, ethanol, isopropanol, dimethylformamide, dimethyl sulfoxide, etc.

When the polymerization reaction of the present invention is carried out in the presence of organic solvent, the organic solvent is contained in a proportion of preferably 1 wt % to 300 wt %, and more preferably 10 wt % to 100 wt % based on 100% of the total polymerization reaction mixture.

The weight average molecular weight (hereinafter referred to as "Mw") of the resin powder (J) obtained by the production process according to the present invention is preferably 10000 to 1000000, more preferably 20000 to 800000, and most preferably 40000 to 700000.

The weight average molecular weight of the resin powder (J) can be measured by means of static light-scattering measurement, gel permeation chromatography (GPC), film osmotic pressure measurement, a low angle light-scattering method, etc. For higher accuracy, static light-scattering measurement is preferable.

The volume-average primary-particle diameter of the resin powder (J) is preferably at least 1 nm, more preferably at least 2 nm, and most preferably at least 3 nm; and preferably 300 nm or less, more preferably 200 nm or less, still more preferably 100 nm or less, and most preferably 45 nm or less.

The above volume-average particle diameter can be measured by transmission electron microscope measurements, sedimentation methods, electrozone methods, static light-scattering-measurements, small-angle-scattering methods (SAXS), wide angle dispersion (XRD), super-small angle scattering (USAXS) and the like. Due to their suitability for measuring particle size distribution, static light-scattering-measurements, small-angle-scattering methods, and transmission electron microscope measurements are desirable, and static light-scattering measurements and transmission electron microscope measurements are particularly desirable.

The resin powder (J) of the present invention can be separated from the polymerization reactants by, for example, after solution polymerization, removing the organic solvent to recover the resin powder (J); by adding a precipitation solvent (aliphatic hydrocarbon-type solvents, alicyclic hydrocarbon-type solvents, alcoholic solvents, etc.) into the polymerization mixture after solution polymerization and filtering the precipitated resin powder (J) for collection; by dissolving, after mass polymerization, the polymerization mixture in an organic solvent (the above aromatic hydrocarbon-type solvents, chorinated solvents, ester-type solvents, ether-type solvents, ketone-type solvents, amide-type solvents and sulfoxide-type solvents), followed by the addition of an above precipitation solvent to recover precipitated resin powder (J); by polymerizing, in the above precipitation solvent, the monomers and filtering the precipitated resin powder (J) for collection; by recovering the resin powder (J) by means of a spray-dry method; or the like.

The process for producing the resin powder (J) of the present invention has the following characteristics.
(1) Low viscosity polymer can be easily obtained.
(2) Nanoparticles are obtained, enabling flexible compositions.
(3) Several double-bonds are included in the particulate polymer molecules, enabling their potential development into macromers.
(4) Three dimensional polymers containing various multiple highly-branched functional terminal groups can be obtained.
(5) Functional groups are gradiently distributed from the particle center to the outer surface of the polymer.
(6) Initiator residues can be incorporated into the polymer terminals.
(7) Polymers that are highly soluble in various solvents can be obtained.
(8) The production process is applicable to both oil-soluble and water-soluble monomers
(9) A particulate polymer of any crosslinking density can be obtained.

The present invention will be described in further detail below with reference to Examples, but is not limited to these Examples. In the following description, "parts" refers to weight parts, and "%" to weight %.

The Mw and volume-average primary-particle diameter of the powder obtained were measured in the following manner. Mw: Measured by static light-scattering measurement. More specifically, a multiple-angle light-scattering detector (Wyatt DAWN EOS & mini DA: SHOWA DENKO, K. K.) was used.

Volume-average primary-particle diameters were measured using the following two apparatuses.

Volume-average primary-particle diameter measurement 1: Measured by a transmission electron microscope (H-7100: Hitachi, Ltd.) Volume-average primary-particle diameter measurement 2: Measured by static light-scattering measurement- More specifically, a multiple-angle light-scattering detector (Wyatt DAWN EOS & mini DA: SHOWA DENKO, K. K.) was used.

EXAMPLE 1

A pressure-resistant reaction container was loaded with 5600 parts of benzene and the air inside the container was replaced by nitrogen. The container was then hermetically closed and the temperature was raised to 70° C. Subsequently added dropwise over 2 hours were a mixture of 10 mol of a monomer mixture of 651 parts (5 mol) of divinylbenzene (B-1) and 540 parts (5 mol) of p-ethylstyrene (A-1), 2303 parts (10 mol) of dimethyl 2,2'-azobisisobutylate (C-1), and 1950 parts (10 mol) of methyl benzyl oxyiminoacetate (D-1) The amount of monomer (C) was 100 mol % based on the total mol amount of monomers (A) and (B), and the amount of monomer (B) was 100 mol per 100 mol of monomer (A). The monomer mixture was then aged at the same temperature for 12 hours, and then 20000 parts of hexane was added to precipitate the polymerization mixture, and the precipitate was collected by filtration to obtain a resin powder (J-1). The powder yields was 46%. The Mw of the resin powder (J-1) was 300000, volume-average particle diameter measurement 1 was 7.3 nm, and volume-average particle diameter measurement 2 was 21 nm.

EXAMPLE 2

A resin powder (J-2) was obtained in the same manner as in Example 1, except that the reaction temperature was 80° C. and the monomer mixture was aged for 4 hours. The powder's yield was 43%. The Mw of the resin powder (J-2) was 400000, volume-average particle diameter measurement 1 was 8.1 nm, and volume-average particle diameter measurement 2 was 25 nm.

EXAMPLE 3

A pressure-resistant reaction container was loaded with 1200 parts of benzene and the air inside the container was replaced by nitrogen- The container was then hermetically closed and the temperature was raised to 80° C. Subsequently added dropwise over 2 hours were a mixture of 10 mol of a monomer mixture of 1328 parts (6.7 mol) of ethylene glycol dimethacrylate (B-2) and 594 parts (3.3 mol) of diphenylethylene (A-2), and 1543 parts (6.7 mol) of dimethyl 2,2'-azobisisobutyrate (C-1). The amount of monomer (C) was 67 mol % based on the total mol amount of monomers (A) and (B), and the amount of monomer (B) was 49 mol per 100 mol of the monomer (A). The mixture was then aged at the same temperature for 12 hours, and then 3500 parts of hexane was added to precipitate the polymerization mixture, and the precipitate was collected by filtration to obtain a resin powder (J-3). The powder's yield was 60%. The Mw of the resin powder (J-3) was 100000, volume-average particle diameter measurement 1 was 6.5 nm, and volume-average particle diameter measurement 2 was 9 nm.

EXAMPLE 4

A pressure-resistant reaction container was loaded with 770 parts of benzene and the air inside the container was replaced by nitrogen. The container was then hermetically closed and the temperature was raised to 70° C. Subsequently added dropwise over 2 hours were a mixture of 10 mol of a monomer mixture of 792 parts (4 mol) of divinyl adipate (B-3) and 601 parts (6 mol) of isobutyl vinyl ether (A-3), and 820 parts (5 mol) of azobisisobutylonitrile (C-2). The amount of monomer (C) was 50 mol % based on the total mol amount of monomers (A) and (B), and the amount of monomer (B) was 150 mol per 100 mol of monomer (A). The mixture was then aged at the same temperature for 12 hours, and then 2300 parts of hexane was added to precipitate the polymerization mixture, and the precipitate was collected by filtration to obtain a resin powder (J-4). A powder's yield was 44%. The Mw of the resin powder (J-4) was 680000, volume-average particle diameter measurement 1 was 10.5 nm, and volume-average particle diameter measurement 2 was 33 nm.

COMPARATIVE EXAMPLE 1

A pressure-resistant reaction container was loaded with 492 parts of benzene and the air inside the container was replaced by nitrogen. The container was then hermetically closed and the temperature was raised to 70° C. Subsequently added dropwise over 2 hours were a mixture of a monomer mixture of 10 mol of 792 parts (4 mol) of divinyladipate (B-3) and 601 parts (6 mol) of isobutyl vinyl ether, and 13.9 parts (0.085 mol) of azobisisobutylonitrile (C-2). The amount of monomer (C) was 0.85 mol % based on the total mol amount of monomers (A) and (B), and the mol amount of monomer (B) was 150 mol per 100 mol of monomer (A). When the mixture was then aged at the same temperature for 12 hours, a gelated product insoluble in benzene was produced.

COMPARATIVE EXAMPLE 2

A Schlenk tube equipped with a thee-way connecting adapter was degassed and filled with nitrogen. Subsequently added thereto were 1500 parts of tetrahydrofurane, 0.014 parts ($2.2 \times 10^{-4}$ mol) of s-butyl lithium and 49 parts (0.47 mol) of styrene, and the mixture was cooled to $-20°$ C. An hour later, 18 parts (0.23 mol) of isoprene was added to the mixture and aged for 8 hours. 16 parts (0.23 mol) of isoprene was then added thereto, and the mixture was further aged for 24 hours. 16 parts (0.23 mol) of isoprene was further added thereto, and the mixture was aged for 2 hours. Subsequently, 100 parts of t-butyl alcohol was added thereto to halt the reaction. The solvent was then gradually removed under normal pressure as the temperature was raised to $80°$ C., and solvent removal was continued for 2 more hours to obtain a resin powder (J-5) under reduced pressure once the temperature reached $80°$ C. The powder's yield was 60%. The obtained resin powder (J-5) had a Mw of 430000, volume-average particle size 1 of 7.5 nm and volume-average particle size 2 of 24 nm.

As demonstrated above, obtaining the resin powder by anionic polymerization requires strict nitrogen purging and a very low reaction temperature, and involves a number of reaction steps. It is hence not as simple as the production process achieved by the present invention.

INDUSTRIAL APPLICABILITY

The resin powder obtained by the production process according to the present invention exhibits, by virtue of quantum size effects, electronic, optical, magnetic, chemical and mechanical properties, that are different from the properties exhibited by the bulk state resin powder. Further, the resin powder of the present invention is expected to have improved filling properties, and therefore should be effective when used as a material for new devices which are required to have high performance, be small-sized, resource-saving, etc.

The invention claimed is:

1. A process for producing a resin powder (J) comprising a radical polymer comprising polymerizing a bifunctional radical-polymerizable monomer (A) with a ter- or higher functional radical-polymerizable monomer (B) in the presence of 15 to 170 mol % of a polymerization initiator (C), based on the sum of monomers (A) and (B).

2. A process for producing a resin powder (J) according to claim 1, wherein the monomers are polymerized in the further presence of an inhibitor (D).

3. A process for producing a resin powder (J) according to claim 1, wherein the proportion of a radical-polymerizable monomer (B) is 20 to 500 mol per 100 mol of radical-polymerizable monomer (A).

4. A process for producing a resin powder (J) according to claim 1, wherein the monomers are polymerized in the presence of an organic solvent.

5. A process for producing a resin powder (J) according to claim 1, wherein said resin powder (J) has a volume-average primary-particle diameter of 1 to 300 nm as determined by static light-scattering measurements.

6. A process for producing a resin powder (J) according to claim 2, wherein the proportion of a radical-polymerizable monomer (B) is 20 to 500 mol per 100 mol of radical-polymerizable monomer (A).

7. A process for producing a resin powder (J) according to claim 2, wherein the monomers are polymerized in the presence of an organic solvent.

8. A process for producing a resin powder (J) according to claim 2, wherein said resin powder (J) has a volume-average primary-particle diameter of 1 to 300 nm as determined by static light-scattering measurements.

* * * * *